(No Model.)
W. BAXTER, Jr.
JOURNAL BEARING FOR ELECTRIC MOTORS.
No. 361,117. Patented Apr. 12, 1887.
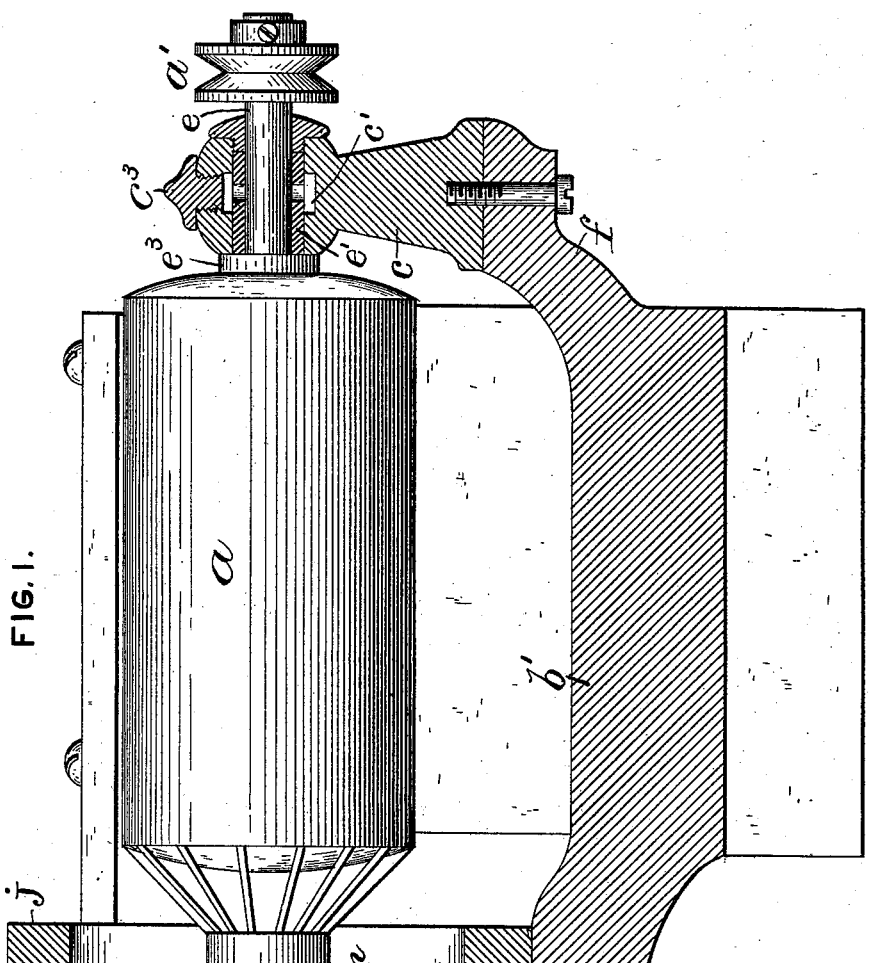
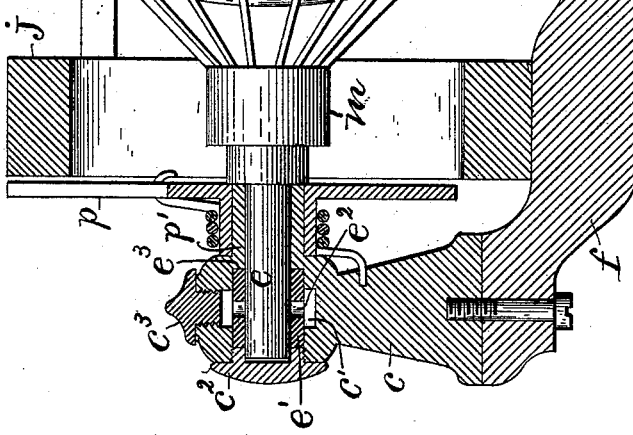
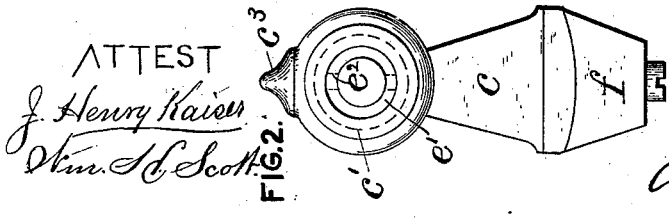
ATTEST
J. Henry Kaiser
Wm. H. Scott
INVENTOR.
Wm Baxter, Jr.
per
Crane & Miller, Attys.

United States Patent Office.

WILLIAM BAXTER, JR., OF BALTIMORE COUNTY, MARYLAND, ASSIGNOR TO THE BAXTER ELECTRIC MANUFACTURING AND MOTOR COMPANY.

JOURNAL-BEARING FOR ELECTRIC MOTORS.

SPECIFICATION forming part of Letters Patent No. 361,117, dated April 12, 1887.

Original application filed October 27, 1886, Serial No. 217,306. Divided and this application filed February 10, 1887. Serial No. 227,143. (No model.)

*To all whom it may concern:*

Be it known that I, WILLIAM BAXTER, Jr., a citizen of the United States, residing at Baltimore County, Maryland, have invented certain new and useful Improvements in Journal-Bearings for Electric Motors; and I do hereby declare the following to be a full, clear, and exact description of the invention, such as will enable others skilled in the art to which it appertains to make and use the same.

This application is a division of my application No. 217,306, filed October 27, 1886, for patent on improvements in electric motors.

The object of this invention is to furnish an electric motor with improved bearings for the armature-spindle, which latter is commonly rotated at a very high speed, and therefore requires excellent lubrication or bearings constructed with the highest anti-friction qualities.

My invention consists partly in the construction for the metallic support to insure the distribution of the lubricant to the bearing only when required and partly in a bushing formed of lignum-vitæ formed concentric with the bearing, and which I have found peculiarly adapted to sustain a rapidly-running journal with very little lubrication.

In the drawings I have shown only such part of an electric motor as is necessary to illustrate my improvement, Figure 1 showing a motor-frame and an armature mounted thereon in a bearing at each end, the construction being analogous to that shown in my aforesaid patent application. The parts hatched in Fig. 1 are shown in vertical section at the center line of the armature, the armature, its spindle, pulley, and commutator $m$ not being shown in section. Fig. 2 is a detached view of the post sustaining the bearing upon a lug projecting from the frame $b'$, the view being taken at the end of the armature-shaft with the cap of the bearing removed; and Fig. 3 is a perspective view of the fiber bushing detached from the post.

$a$ is the armature; $e$, its spindle or supporting-arbor; $m$, the commutator, and $a'$ the motor-pulley.

$c$ are posts mounted upon lugs $f$, projected from the opposite sides of the frame $b'$, and are formed with globular heads bored concentric with the spindle to fit bushings $e'$, which are made interchangeable with one another, so as to fit snugly within the bored head, and retained therein by a screw-cap, as hereinafter described. The bush is thus adapted to be removed with the utmost facility when worn or damaged and a new one replaced with very little loss of time and very little expense. In the construction I have devised the lubricant is preferably of hard fat—as tallow—and is retained in a recess or chamber adjacent to the bushing, and is conducted into the same through suitable holes only when the bushing becomes heated sufficiently to soften the fat.

The recess or chamber is shown at $c'$, formed in the head of the post $c$ around the middle of the bushing, and holes $e^2$ are formed in the bushing to communicate with such recess and admit the lubricator to the journal of the shaft $e$ within. Access to the recess is secured by an opening in the top of the post, closed by a screw-plug, $c^3$, and a cap, $c^2$, may also be applied to the head of the post at the end of the spindle to prevent the escape of the lubricant. Such cap is shown at the left-hand end of the spindle, where the shaft is not required to project through the same; but at the opposite end, where the shaft extends beyond the bearing to carry pulley $a'$, the cap is perforated at its center to permit the passage of the shaft, while it retains the bushing within the head of the post, as required. The left-hand post is formed with a projecting sleeve, $p'$, to carry a rotating arm, $p$, upon which the armature-brushes would be mounted. The inner end of such sleeve forms a fixed collar, $e^3$, and serves at the end of the bearing opposite to the cap $c^2$ to retain the bushing in place, while a similar rotating collar, $e^3$, adjacent to the other bearing, serves to hold the bushing in place at the opposite bearing.

In practice the hard fat is stuffed in the recess $c'$ by removing the plug $c^3$, and a little placed within the bushing, and the fat in the recess then remains unconsumed until the consumption of the lubricant within the bushing induces a trifling amount of heat sufficient to soften the lubricant in the recess, which then enters the bushing through the holes $e^2$ and renews the lubrication therein. By using a lubricant which is not fluid enough to flow out of the bearing or recess, and by guarding the ends of the bearing, as set forth, I avoid all waste or leakage and am enabled to insure the presence of the lubricant in the recess $c'$ for a long time. The anti-friction properties of the bearing constructed and lubricated in the manner described are so great that I have actuated such a spindle in such a bearing with tallow as a lubricant for more than two months consecutively without any perceptible heating or wear or renewal of the lubricant.

By constructing the receptacle for the lubricant as a recess surrounding the entire middle of the bushing, and by using a hard fat adapted to retain its position in such recess, it is obvious that a very small degree of heat when generated within is sufficient to soften the lubricant in the most effective manner, owing to the rapid convection of the heat to the fat through the bushing in contact therewith. The construction of the recess around the bushing also affords the opportunity to form as many of the holes $e^2$ as may be desired, only two such holes being shown in the bushing in Fig. 1, while a greater number would be employed around large spindles.

I am aware that it is not new to bush a bearing so as to renew the worn surface of the same when desired, and my invention does not, therefore, consist simply in the use of such a bushing. I am also aware that lignum-vitæ has been used in the form of staves or boxes to form a bearing for a journal, especially under water for the use of turbines; but I am not aware that it has ever been formed in a removable bushing adapted to fit a head such as I have devised, and therefore renewable with very little loss of time and scarcely any expense when worn. The use of such a vegetable substance wholly prevents any injury to the spindle in case of heating, as it is so much softer than the material of the spindle, and such a peculiarity is a very material advantage in a construction where such high speed is employed as in an electric motor. The formation of the recess $c'$ concentric with the spindle enables me to form a bearing of exceedingly neat appearance externally, while the application of the cap $c^2$ and plug $c^3$ operate in the most effective manner to prevent the loss of the lubricant and to prevent the access of grit and dust to the bearing. Any desired material may be used for the bushing, provided all the other features of my construction are retained.

Having thus set forth my improvement, I disclaim my aforesaid patent application, No. 217,306, filed October 27, 1886, and claim my present improvements in the following manner:

1. In a spindle-bearing, the combination, with the post $c$, having a bored head and a recess, $c'$, and an aperture at one side of the same, closed by the plug $c^3$, for placing lubricant in the recess, of a concentric bushing provided with one or more holes, $e^2$, connecting the interior of the bushing with said recess, as and for the purpose set forth.

2. In a spindle-bearing, the combination, with the concentric removable bushing having openings or holes $e^2$ through its sides, of the post $c$, having a bored head and a recess surrounding the middle of the bushing, and provided with the metallic collar $e^3$ at one end of the bushing, the screw-cap $c^2$, for the insertion of the bushing at the opposite end, and the aperture, having the screw-plug $c^3$, for supplying the lubricant to the recess, as and for the purpose set forth.

3. In a spindle-bearing, the combination, with the concentric removable bushing of lignum-vitæ, having holes $e^2$, of the post $c$, having a bored head and recess $c'$, metallic collar $e^3$, screw-cap $c^2$, and aperture provided with the screw-plug $c^3$, the whole arranged and operated as and for the purpose set forth.

In testimony whereof I affix my signature in presence of two witnesses.

WILLIAM BAXTER, JR.

Witnesses:
   THOS. S. CRANE,
   V. W. MIDDLETON.